Oct. 23, 1951  G. W. JOHNSON  2,572,265
BALANCING DEVICE
Filed Feb. 10, 1949
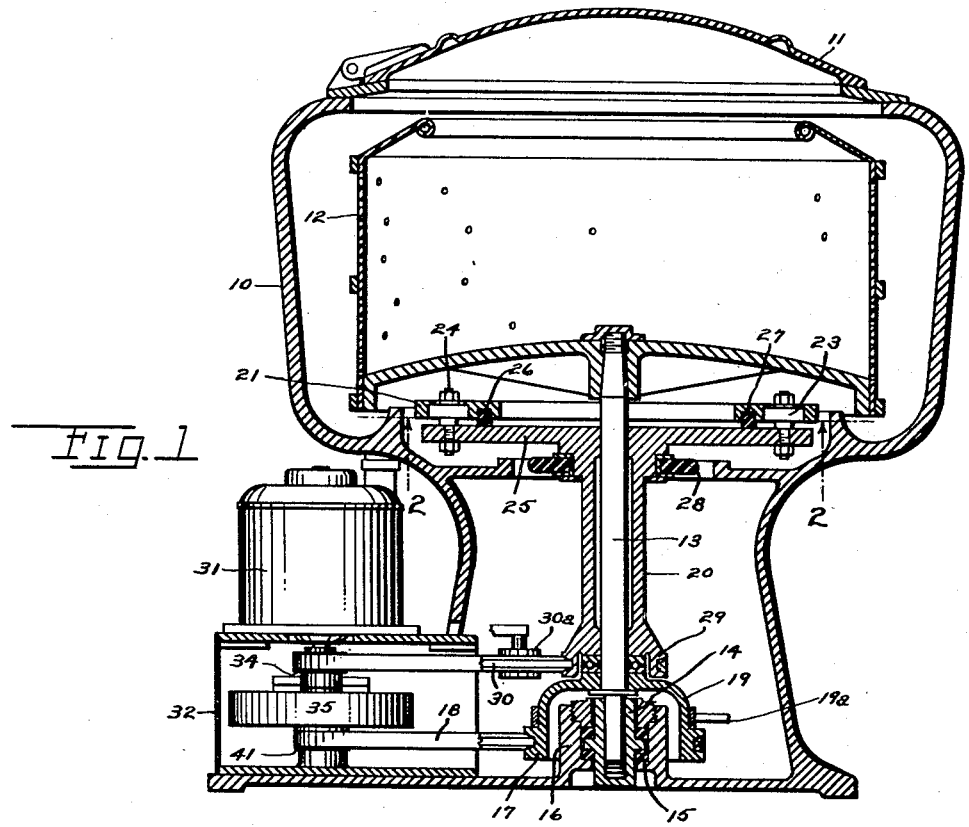
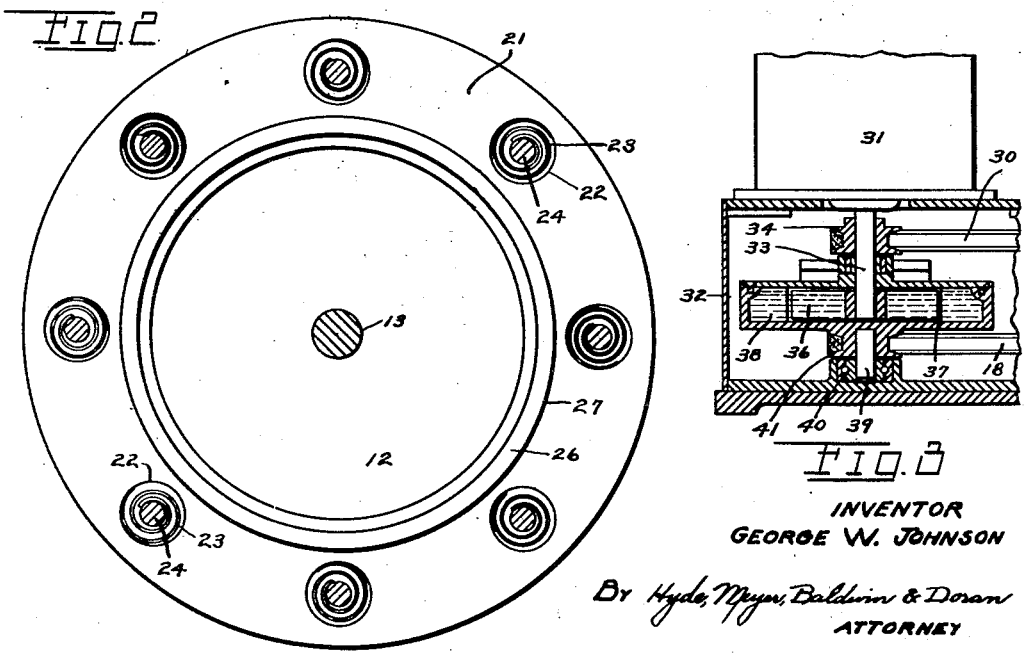
INVENTOR
GEORGE W. JOHNSON
By Hyde, Meyer, Baldwin & Doran
ATTORNEY Patented Oct. 23, 1951

2,572,265

UNITED STATES PATENT OFFICE 2,572,265

BALANCING DEVICE

George W. Johnson, Cincinnati, Ohio, assignor to The American Laundry Machinery Company, Norwood Station, Cincinnati, Ohio, a corporation of Ohio Application February 10, 1949, Serial No. 75,535

5 Claims. (Cl. 74—574)

This invention relates to balancing devices, such as are used to dampen the vibrations of rapidly rotating bodies. The invention is an improvement upon that described and claimed in my prior Patent No. 2,144,064 granted January 17, 1939, for Balancing Device for Extractors.

While the invention is capable of use to reduce vibration of any rotating body, it is here illustrated in typical from applied to a centrifugal extractor, the perforate basket of which is started and stopped frequently and carries a load which usually is or cannot be distributed absolutely evenly about the central axis. The balancing device of my prior patent is driven by a source of power which is separate and distinct from that which drives the basket.

One object of the invention is to provide for a rotating body improved balancing or vibration damping means which automatically is accelerated in advance of said body.

A further object is to provide an improved arrangement of rotating body and vibration damping means therefor in which both are driven from the same power source, but in a manner to accelerate the damping means in advance of the rotating body.

Still another object is to provide improved driving connections for a rotating body and vibration damping means therefor in which the rotating body and damping means are driven from the same source, one by a direct connection and the other through a slip or lost motion connection, so that one is accelerated before the other.

Another object is to provide an improved arrangement of rotating body and vibration damping means, both driven by the same power motor, one directly and the other through fluid clutch means, thus to accelerate one before the other.

Further objects of the invention in part are obvious and in part will appear more in detail hereinafter.

In the drawings,

Fig. 1 is a sectional elevation, showing one form of my invention applied to a centrifugal extractor;

Fig. 2 is a sectional plan view, from beneath, on the line 2—2, Fig. 1; and

Fig. 3 is a detail sectional elevation, on a larger scale, through the driving shaft and fluid clutch.

In many respects, the extractor shown in the drawings to typify one class of devices to which the present invention may be applied is like that of my prior patent referred to and requires but brief description.

The extractor shown comprises a stationary curb 10, provided with a hinged cover 11, in which rotates a foraminous work holding basket or drum 12 mounted upon the upper end of shaft 13 journalled in a bearing member 14 provided with the usual resilient mounting in rubber rings 15 carried by support 16, enabling the shaft and basket to tilt to a limited amount as it rotates, all as usual. On shaft 13 is mounted a pulley 17 driven by belt 18, it being understood that, as is usual, a drum portion 19 of the pulley may serve as a brake drum for cooperation with suitable brake means 19a used for the purpose of quickly bringing the basket to rest when the power is shut off.

Upon shaft 13 is rotatably mounted a sleeve 20 to which the vibration damping member is attached. This is an annulus or ring 21 provided with a series of circumferentially spaced openings 22, in each of which is mounted a spiral spring 23 attached at its outer end to ring 21 and at its inner end to a bolt or stud 24 mounted on a circular plate or table 25 integral with or attached to sleeve 20. A rubber ring 26 mounted in an annular groove 27 of ring 21 supports the ring 21 and relieves the springs 23 of load other than in the generally horizontal direction. A rubber bumper 28 limits basket tilt.

Sleeve 20, at its lower end is provided with a pulley member 29 driven by belt 30.

Referring to Fig. 3, the power source for driving or rotating both the basket and the vibration damping ring 21 is an electric motor 31 mounted upon a boxlike side extension 32 of the extractor curb.

Motor shaft 33 drives member 21 by any suitable connecting means of non-slip form under normal operating conditions, so that in starting and stopping, the motor and member 21 accelerate and decelerate synchronously. Chain and sprocket connections would be suitable, but from the practical standpoint, a V-belt 30 traveling over driving pulley 34 and a groove in sleeve 20 and tightened by a floating belt tightening pulley 30a conventionally shown is satisfactory.

An extension of shaft 33 is used to drive belt 18, shaft 13 and basket 12. This driving connection includes means for insuring that when the motor is energized to start the extractor basket, the vibration damping member 21 is accelerated, and even reaches full speed, ahead of or before the loaded extractor basket. In other words, the rate of acceleration of the basket is retarded, while that of member 21 is synchronous with the motor shaft. Any slipping connection may be used for the purpose.

The means shown is a fluid clutch, although other arrangements may be employed. As shown, shaft 13 extends into the chamber of a sealed drum form casing 35, where it is provided with impeller vanes or paddles 36 working in an oil bath 37 which fills the chamber. Opposite the vanes 36, the chamber wall carries vanes 38. Casing 35 is provided with a shaft 39 turning in a bearing 40 and provided with a pulley 41 which drives belt 18.

It should be noted that pulleys 34, 41 are of approximately the same size, while pulley 17 is considerably larger than pulley 29. The gear ratios in the two trains from the motor shaft consequently differ and at full speed ring 21 is driven at higher speed than the basket. But the gear ratios in the two trains are not important.

The operation is as follows:

Motor 31 may be either a single speed motor, in which case, upon starting, it accelerates rapidly to full speed, or a variable speed motor manually controlled, in which case it accelerates to the desired full speed in accordance with the manner of its manual control. In either case, when starting the extractor, during the period of acceleration of the motor to full speed, the vibration damping ring 21 accelerates synchronously with the motor, or at the same rate. There is no slippage or lost motion between them. However, in either case, during the same period of acceleration, shaft 13 and the extractor basket lag behind the vibration damping ring 21. Acceleration of the ring is retarded.

The first effect of motor shaft 33, within the fluid clutch, is to rotate the vanes 36 within the bath of oil or other liquid contained in the casing. At first, vanes 36 rotate without appreciable motion of the clutch casing 35. However, the rotating effect is transmitted through the liquid bath to vanes 38, which begin to turn with the vanes 36 and gradually pick up speed until, in the end, as in all fluid or other slip clutches, the rotated clutch part travels at substantially the same speed as the driving clutch part, subject to a possible small net loss.

The purpose of balancing a vibration damping device of this kind is to take care of out of balance load conditions which tend to cause the basket and its shaft to tilt to one side or the other and vibrate around the true center of rotation. Consequent vibration, during acceleration, is considerably amplified at certain critical speeds of the basket and shaft. In practice it is found that by compelling acceleration of the vibration damping ring in advance of acceleration of the basket and shaft, the consequent roughness and unnecessary or undesirable vibration are considerably reduced, if not entirely eliminated. In other words, in starting, if the unbalanced condition, either of the basket and shaft alone or of the basket and shaft and basket load, is not in unreasonable excess, the present arrangement will take care of it and bring the basket to full speed, spinning quietly on a substantially stationary axis, in a short period, and without undue roughness.

Of course, the same effects occur in reverse order in stopping the machine. During deceleration, the basket and shaft usually are stopped as quickly as possible, to save time, by the application of brake 19a to the drum 19. The consequent braking effect quickly decelerates the basket and shaft, but since the motor current has been shut off the motor shaft and the damping ring tend to coast freely and continue to dampen vibration of the basket and its shaft. Thus, in stopping deceleration of the damping ring is retarded, relative to deceleration of the basket and its shaft.

The invention, of course, may be applied to other machines or devices than extractors, such as flywheels and other rotating bodies.

What I claim is:

1. In combination, a rotatable body, said body having a portion concentric with the axis of rotation of the body, a rotatable centripetal vibration damper of annular contour disposed generally concentric with said body portion and having free rotational contact with said portion, a driving motor, there being a slip clutch driving connection between said motor and said body portion, and constant ratio driving connection means for transmitting rotational torque from said motor to said vibration damper.

2. In combination, a rotatable body, a rotatable shaft affixed to said body concentric with the axis of rotation thereof, vibration damping means having a sleeve portion surrounding and rotatable independently of said shaft, a motor for supplying rotational torque both to said shaft and to said sleeve, there being a constant ratio driving connection between said motor and said sleeve, and a slip clutch driving connection between said motor and said shaft.

3. In combination with a rotatable body a driven shaft affixed to said body in alignment with the axis of rotation thereof, vibration damping means having a sleeve portion surrounding and in contact with said shaft and rotatable independently thereof, a driving shaft, means for rotating said driving shaft, a constant ratio driving connection between said driving shaft and said sleeve portion, and a slip clutch driving connection between said driving shaft and said driven shaft.

4. In combination with a rotatable body a driven shaft affixed to said body in alignment with the axis of rotation thereof, vibration damping means having a sleeve portion surrounding and in contact with said shaft and rotatable independently thereof, a driving shaft, means for rotating said driving shaft, a constant ratio driving connection between said driving shaft and said sleeve portion, and a slip clutch driving connection between said driving shaft and said driven shaft, said slip clutch connection comprising a fluid clutch whereof the complementary vanes are coupled respectively to the driving shaft and to the driven shaft.

5. In combination, a rotatable body, a driven shaft affixed to said body in alignment with the axis of rotation thereof, vibration damping means of centripetal character having a sleeve portion embracing said shaft and rotatable independently thereof, a driving shaft, means for rotating said driving shaft, a slip clutch driving connection between said driving shaft and said driven shaft, and a constant ratio driving connection between said driving shaft and said sleeve portion, the driving ratio between said driving shaft and said sleeve portion being such that said vibration damper rotates faster than said driven shaft at all times during energization of said means for rotating said driving shaft.

GEORGE W. JOHNSON.

REFERENCES CITED

The following references are of record in the file of this patent:

UNITED STATES PATENTS

| Number | Name | Date |
|---|---|---|
| 1,887,355 | Kranick | Nov. 8, 1932 |
| 1,993,405 | Heitshu | Mar. 5, 1935 |
| 2,144,064 | Johnson | Jan. 17, 1939 |
| 2,467,108 | Barlow | Apr. 12, 1949 |